United States Patent [19]

Francois et al.

[11] 4,078,670
[45] Mar. 14, 1978

[54] CABLE-OPERATED POWER MANIPULATOR

[75] Inventors: Daniel Francois, Vendome; Jean-Claude Germond, Paris; Paul Marchal, Gif-sur-Yvette; Jean Vertut, Issy-les-Moulineaux, all of France

[73] Assignee: Commissariat a l'Energie Atomique, Paris, France

[21] Appl. No.: 596,122

[22] Filed: Jul. 15, 1975

[30] Foreign Application Priority Data

Jul. 18, 1974 France .................. 74 25055

[51] Int. Cl.² .............................................. B25J 3/00
[52] U.S. Cl. .................... 214/1 CM; 3/12.1; 3/1.1
[58] Field of Search ............. 254/173 R; 214/1 CM; 3/12.1, 12.2, 12.3, 12, 1.1

[56] References Cited

U.S. PATENT DOCUMENTS

| | | | |
|---|---|---|---|
| 1,619,559 | 3/1927 | Berry et al. | 294/21 |
| 1,693,074 | 11/1928 | Falco | 294/112 X |
| 1,926,948 | 9/1933 | Iffland | 294/21 |
| 2,992,746 | 7/1961 | Olson et al. | 214/1 CM |
| 3,212,651 | 10/1965 | Specht et al. | 214/1 CM |
| 3,335,620 | 8/1967 | Vertut | 214/1 CM X |
| 3,703,968 | 11/1972 | Uhrich | 214/1 CM X |

Primary Examiner—Drayton E. Hoffman
Assistant Examiner—Donald W. Underwood
Attorney, Agent, or Firm—Sughrue, Rothwell, Mion, Zinn and Macpeak

[57] ABSTRACT

The movement of rotation of each element of the manipulator arm about the shoulder, elbow and wrist pins is controlled by a motor and a cable consisting of two oppositely-acting lengths by means of a pulley-block which carries at least two lengths, two pairs of pulley-blocks being located within a barrel unit. The length of cable which emerges from each pulley-block is passed over a return pulley carried by the shoulder pin and guided within a stationary manipulator body in a direction parallel to the axis of the barrel unit, each emergent length of cable being actuated by one of the motors mounted on the manipulator body.

6 Claims, 9 Drawing Figures

CABLE-OPERATED POWER MANIPULATOR

This invention relates to a cable-operated power manipulator.

There are many known designs of power manipulators which are usually controlled by push-button stations or devices for combining a number of movements which are always carried out in an open loop solely by visual control. These different manipulators are provided systematically with irreversible control systems of the electric, pneumatic or hydraulic type.

Power manipulators of a general type providing reversible control are also known. As a rule, manipulators of this type are operated by means of servocontrol systems in which two arms of identical or similar design are connected to each other, one so-called "master arm" being intended to subject the displacements of a so-called "slave arm" to position-control means and at the same time to restitute the efforts applied to or sustained by this latter at the level of the master arm held by the operator. These manipulators therefore entail the need for low-inertia, high-performance motors associated with reduction-gear systems which also have high performances but nevertheless give rise to friction and play. Furthermore, the weight and cost price of such systems are unfavorable to their development.

The invention is directed to manipulators of this type and makes it possible to overcome the various disadvantages which arise from the use of reduction-gear motor sets.

The primary aim of the invention is to provide an articulated power manipulator of the type comprising a stationary body on which are mounted at least four motors and on which an arm is pivotally mounted on an axis of general rotation, said arm being provided with at least one barrel unit which is subjected to said general rotation, said axis of general rotation being such as to coincide with the longitudinal axis of said barrel unit, and at least two articulated elements consisting of an upper arm pivotally attached to said barrel unit at the level of a shoulder pin having an axis which intersects with said axis of general rotation and of a lower arm pivotally attached to the upper arm at the level of an elbow pin at right angles to the plane formed by the two arms, said shoulder and elbow pins being parallel or capable of being parallel in a particular position of the rotation of the upper arm about its axis if necessary, said lower arm being adapted to carry a wrist pivot-pin which supports a component, an end tool constituted by a tong unit or an operating handle endowed with at least one pivotal movement about a wrist pin which is perpendicular to the lower arm, said arm being capable of being balanced essentially against gravity, characterized in that the rotation of each element of said arm about said pins is controlled by a motor which actuates a cable consisting of two oppositely-acting lengths by means of a pulley-block which carries at least two lengths and that at the same time at least two pairs of said pulley-blocks are located within the barrel unit, the length which emerges from each pulley-block aforesaid being passed back over a return pulley carried by the shoulder pin and being guided witin said stationary body so as to remain parallel to the axis of said barrel unit and in the vicinity thereof, each emergent length of cable being actuated by one of said motors.

In accordance with another characteristic feature, the oppositely-acting lengths of each cable or belt which control the movements proper of the end element pass on each side of two pulleys having the same diameter which are secured respectively to the shoulder pin and to the elbow pin, and each length of a cable is guided within the barrel unit by means of return pulleys secured respectively to the barrel unit and to the body so as to ensure that said lengths are parallel to the axis of said barrel unit, the end of each length of cable being secured to the movable pulley of a pulley-block comprising at least two lengths, one of the extremities of each pulley-block aforesaid being stationary and the other extremity being wound onto a common capstan mounted on a motor which is rigidly fixed to said body.

In accordance with a third characteristic feature, the oppositely-acting lengths of each cable or belt which control the movements proper of the end element pass on the same side of two pulleys having the same diameter which are secured respectively to the shoulder pin and to the elbow pin and each oppositely-acting length is guided within said barrel unit by a return pulley and by a pulley which is capable of moving in a direction parallel to the axis of said barrel unit so as to ensure that each length is parallel to the axis of said unit, said length of cable at the exit of the movable pulley being directed towards the movable pulley, a pulley-block carrying at least two lengths of cable and driven by a motor which is secured to said body, said movable pulley being driven by a cable passed over a pulley which is rigidly fixed to said body and placed in the axis of said barrel unit, said cable being secured at one end to the axis of said movable pulley and at the other end to a small pulley rigidly fixed to the shoulder pin and having a diameter which is one-half the diameter of the pulley which is rigidly fixed to said pin.

It will be possible to gain a better understanding of the invention from the accompanying drawings, in which :

FIG. 4 is a diagram showing an alternative embodiment of the control system shown in FIG. 3a.

Figure 1A:
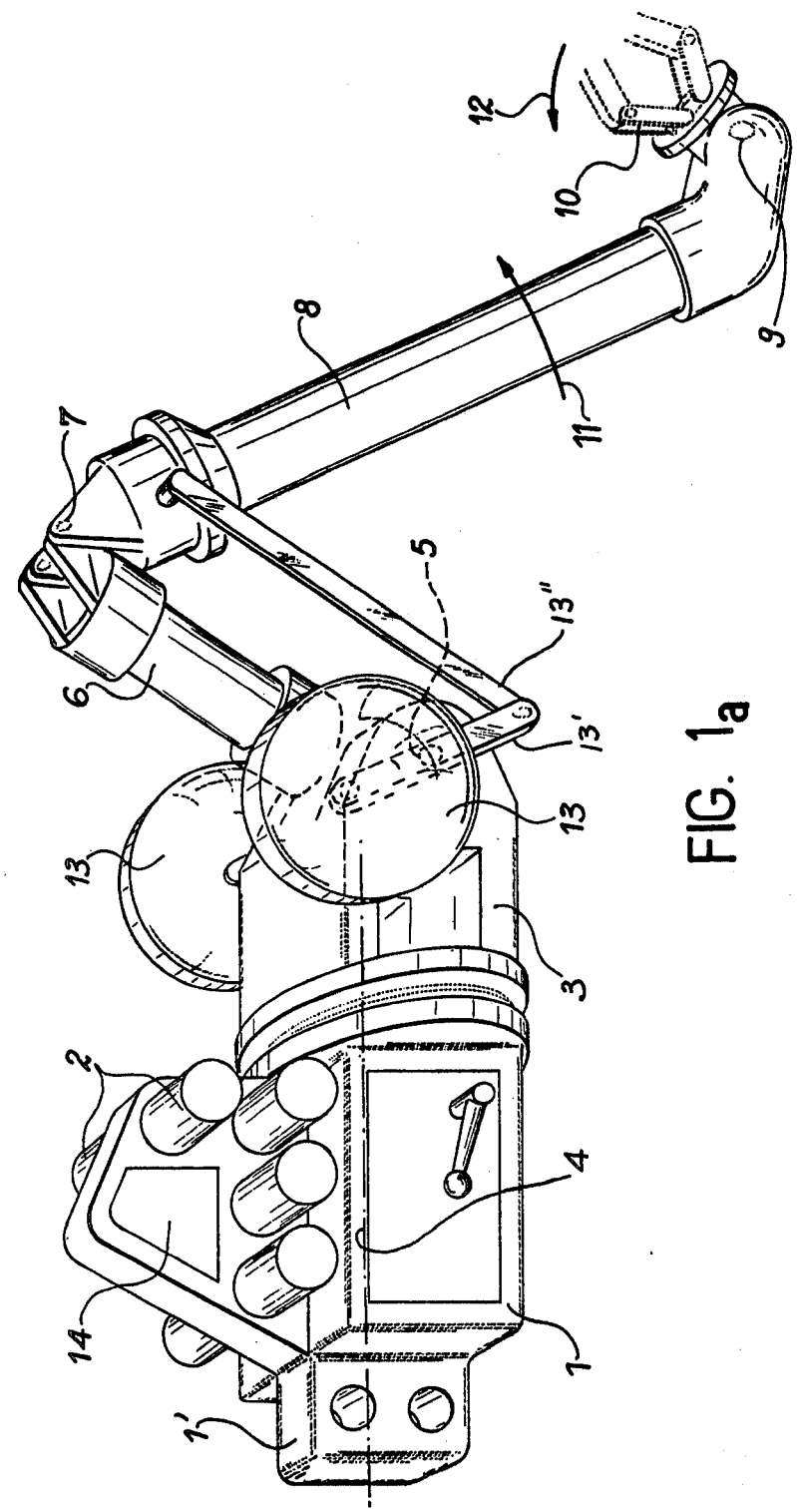
FIGS. 1a and 1b are views in perspective showing two embodiments of the manipulator.
Figure 1B:
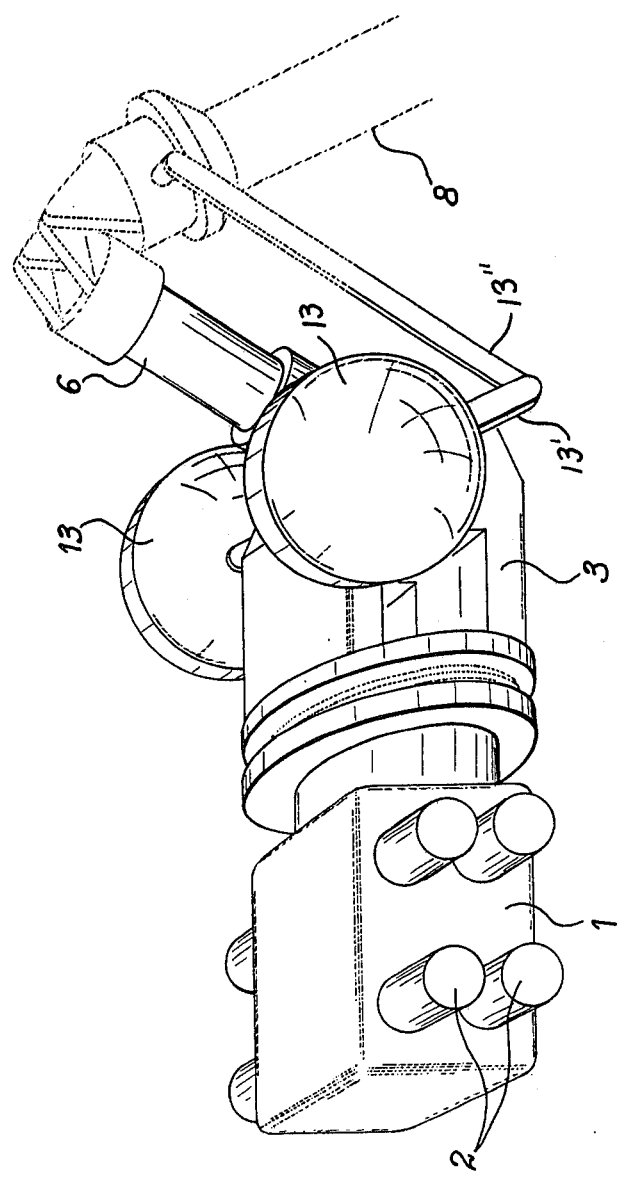

Two embodiments of the manipulator in accordance with the invention are shown in FIG. 1 : thus FIG. 1a shows a manipulator which is more especially intended for operation with a horizontal barrel unit in a stationary support system; FIG. 1b shows an arrangement in which the manipulator can be placed in a completely straight line for operation with the barrel unit either in a vertical position or in a horizontal position and which makes it possible in particular to effect a withdrawal into a protective sleeve by means of a sliding movement along said barrel unit. FIG. 1a shows the body 1 of the remote manipulator, said body being carried by a support 1', there being mounted on said support motors as designated by the reference 2 and placed laterally in this example on the visible face and on the hidden face. The barrel unit 3 is endowed with a movement about the axis 4 of general rotation which coincides with the axis of said barrel unit. Said unit terminates in the shoulder articulation or pivot pin 5 having an axis which is perpendicular to the axis 4 and intersects with this latter. An upper arm 6 is pivoted to said shoulder pin 5 and terminates in an elbow articulation or pivot pin 7 having an axis which is parallel to the shoulder pin 5. A lower arm or fore-arm 8 is pivotally mounted on the elbow pin and terminates in a wrist articulation or toggle joint 9 which carries a tong unit 10 or alternatively an operating handle 10 in the case of the control or master arm, or again as a further alternative a tool of any suitable type. In accordance with a known arrangement, the lower arm 8 is capable of moving in rotation about its own axis in the direction of the arrow 11 and the tong unit is capable of carrying out a movement of elevation about the axis of the toggle joint 9 and a movement about the axis proper of the tong unit in the direction of the arrow 12. Finally, said tong unit is endowed with an inherent clamping movement.

The complete assembly consisting of the barrel unit 3 and of the arms 6 and 8 forms a plane in which the tong unit 10 can also be located in the position which is suitable for carrying out the movement of rotation in the direction of the arrow 11. Finally, balance weights 13 placed on each side of the barrel unit 3 ensure as a result of an arrangement which is homothetic with the center of gravity of the arms 6 and 8 the balancing of the assembly about the axes 7, 5 and 4, irrespective of the orientation of the axis 4. The weights 13 are mounted on the ends of levers 13' which are pivoted on the pin 5. The opposite ends of the levers 13' are connected to arms 13'' which in turn are connected to the end of the lower arm 8 and adjacent pin 7. It has also been shown in the figures that power amplifiers 14 are mounted on the lateral faces of the manipulator body 1 between the different motors such as 2 in the vicinity of these latter.

A manipulator of the type which is described can therefore carry out seven separate movements. It would also be possible to endow the upper arm 6 with an auxiliary movement of rotation about its own axis which is similar to the movement of the lower arm 8, thus constituting an alternative form of this arrangement.

It can readily be seen that maximum clearance is provided in this manipulator for the zone located beneath the barrel unit and the shoulder and that there can readily be mounted on the body 1 either one or two manipulators located side by side beneath an equipment unit which ensures its mobillity in a deleterious medium, e.g. a traveling bridge system which operates in cartesian coordinates or any other equivalent device.

There is shown in FIG. 1b another arrangement of the manipulator according to the invention in which the different motors such as the motor 2 and the body 1 are in line with the barrel unit 3 and said unit carries an arm which is similar to that shown in FIG. 1a. In this figure, said arm is shown with a horizontal barrel unit and is particularly well-suited to easy withdrawal through a passageway formed in the thickness of a shield provided between a deleterious medium and a healthy medium. The arm aforesaid can also be housed in a prismatic or cylindrical container which is placed along a submarine or space vehicle and is intended to protect or transport the arm. Finally, if it is placed in a vertical position of the barrel unit, the manipulator shown in FIG. 1b can constitute one of the elements of a telescopic tube which can be directly extracted in the vertical position.

The different parts of FIG. 2 show the arrangements of the cables which serve to control the different movements of the barrel unit, the shoulder unit or elbow unit by means of corresponding motors in a manipulator in accordance with the invention.

Figure 2A:
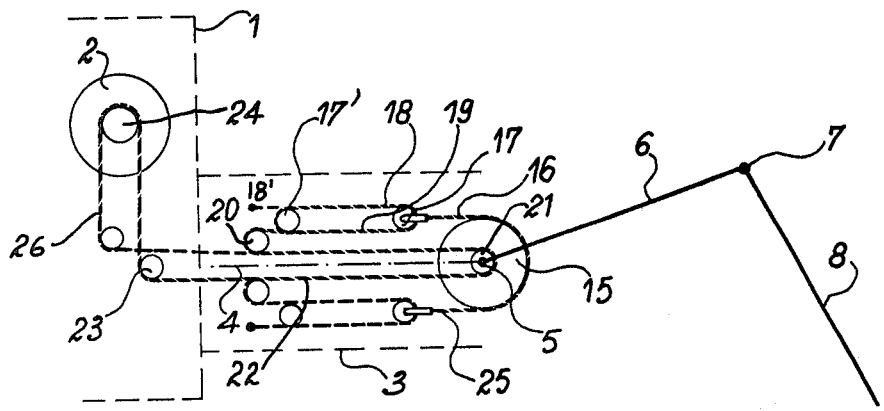
FIGS. 2a, 2b, 2c and 2d are diagrams showing the cables for controlling the movements of the barrel unit and of the shoulder and elbow articulations.

FIG. 2a shows the cable transmissions for the shoulder movement; the upper arm 6 and the lower arm 8 as well as the barrel unit 3 having an axis 4 are shown diagrammatically in the figure. The shoulder axis 5 is represented in this example by a point which is the center of the pulley 15, said pulley being rigidly fixed to the upper arm 6 for producing the movement of this latter about said shoulder axis 5; said pulley 15 is adapted to receive two oppositely-acting lengths 16 and 25 of transmission cable, said cables being attached to said pulley. The length of cable 16 is attached to a movable pulley-block 17 which carries a number of lengths of cable and these latter are supported on the stationary pulleys 17' which are rigidly fixed to the barrel unit; for the sake of simplicity, only two lengths of cable are shown, namely the length 18 which is attached to a fixed point 18' within the barrel unit 3 and the length 19 which has first been passed over the movable pulley-block 17 and is then passed again over a pulley 20, the shaft of which is also fixed on the barrel unit 3. The cable is then passed back over a loose pulley 21 mounted on the shoulder pin 5 which is shown in this case in front of the pulley 15; said length of cable 22 is passed back to the rear of the barrel unit, is supported on a pulley 23 which is rigidly fixed to the body and wound onto a capstan 24 which is carried by the shaft of a motor 2. In practice, in order to obtain a torque which satisfies the practical conditions of a remote manipulator, the pulley-block 17, 17' comprises between two and six lengths of cable depending on the desired force and the motor 2 can be a torque motor having a low speed and a high value of torque. The oppositely-acting length of cable 25 passed over the same driving pulley 15 which is rigidly fixed to the arm 6 is attached to a pulley-block and similar oppositely-acting cable system placed symmetrically beneath the plane defined by the axes 4, 5 and the length 26 is secured to the capstan 24 on the opposite side to the first length.

It will be noted that, during the movement of the barrel unit 3, the assembly consisting of pulley-blocks and cables 16 and 25 remains rigidly fixed to said barrel unit at the time of rotation about the axis 4 and that, since the pulleys such as 23 remain attached to the body, only the cables such as 22 which form a layer undergo a twisting movement about the axis 4 of general rotation. As will become apparent hereinafter, the other transmission cables will be located in the vicinity of the cable 22 which forms said layer. In the arrangement shown in this example, the motor 2 is placed within the body above the barrel unit 3 as shown in FIG. 1a. It can readily be understood that, in the case of FIG. 1b, the motor 2 is located at a greater distance along the axis of the barrel unit 4 and that the pulley 23 no longer serves any useful purpose.

Figure 2B:
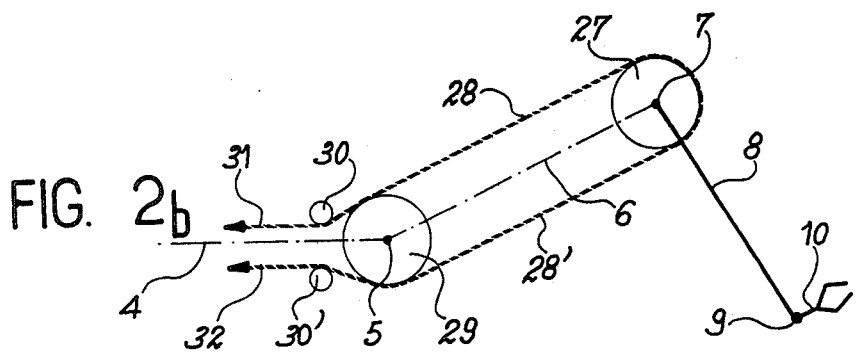

FIG. 2b shows the control of the elbow movement about the axis 7. In the same manner as the pulley 15 mentioned earlier, the pulley 27 which has the axis 7 and drives the lower arm 8 is actuated by two oppositely-acting lengths of cable 28, 28' which are passed around a pulley 29 having the same diameter and the axis 5. There are shown bearing pulleys such as 30 which prevent the length of cable such as 28 from leaving the pulley 29 when the upper arm attains a wide angle of displcement. In the manipulator according to the invention, the ends of the oppositely-acting lengths of cable 31 and 32 which control the pulley 27 for driving the lower arm 8 are attached to pulley-blocks which, as in the case of the pulley-block 17, 17' shown in FIG. 2a, are attached to fixed points and stationary pulleys secured to the barrel unit 3. A readily conceivable arrangement accordingly consists in superposing the elements shown in FIG. 2a and 2b for controlling the shoulder and elbow movements which will entail the need for four pulley-blocks 17, 17', 18, 19, 20, the pulley 15 and the pulley 29 being placed laterally on each side of the axis 4 of the barrel unit; these four pulley-blocks will be disposed in parallel relation within the interior of th barrel unit 3, the four lengths of cable such as 22 being applied against four pulleys such as 21 which are placed in pairs in the proximity of the pulleys 15 and 29. The four pulleys aforesaid will be applied in side-by-side relation against four pulleys such as 23 and said cable lengths will be wound in pairs around two capstans such as 24 which are also located on each side of the unit 1 by means of two motors such as the motor 2 which are located in oppositely-facing relation within the same unit.

In the case shown in FIGS. 2a and 2b, it is readily apparent that, if the two cable lengths 31 and 32 remain motionless and that the cable lengths 16 and 25 which are applied against the pulley 15 impart motion to the upper arm 6, the two parallel cable lengths 28, 28' (FIG. 2b) constitute the equivalent of a parallelogram (the diameter of the pulleys 29 and 27 being the same) when a movement of this type takes place. The effect thereby achieved is that, at the time of this movement which is controlled by the motor 2 shown in FIG. 2a, the pivotal motion of the upper arm 6 is accompanied by a movement of the fore-arm or lower arm 8 in a direction parallel to itself.

Figure 2C:
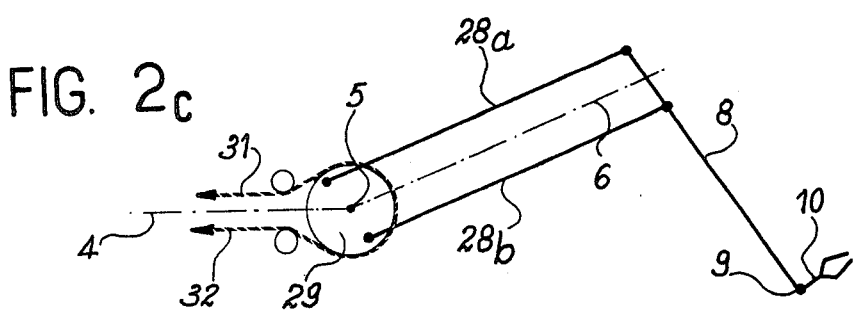

An equivalent movement will be obtained as shown in FIG. 2c by employing instead of the two cable lengths 28, 28' one or two link-arms 28a and 28b which are attached directly to the fore-arm 8, said link-arms and the cable lengths 31 and 32 being fixed on the pulley 29 whose axis coincides with the shoulder axis 5.

If use is made of motors having the same value of torque and pulley-blocks having the same number of cable lengths, it is apparent that provision will be made for pulleys 15 and 29 which have the same diameter if the two arms 6 and 8 have the same length and that, if these two arm lengths are different, the diameters must be proportional so as to ensure that the driving lengths of said arms work at the same maximum value of applied force under maximum load.

It is further apparent that, after having returned over the pulleys such as 21 and over the pulleys such as 23, the four cable lengths such as 22 derived from the four pulley-blocks corresponding to the two elbow and shoulder movements constitute a layer of four cables acting oppositely in pairs which, at the time of the movement of general rotation about the axis 4, will be subjected to torsional displacement in a layer through a substantial angle which can attain approximately one full revolution at a maximum value. It should also be noted that the use of pulleys having the same diameter for the transmission of motion of the lower arm (the same parallelogram shown in FIG. 2c is equivalent to said pulleys having the same diameter) constitutes an advantageous feature of the invention. The result thereby achieved is that the reduction ratios corresponding to the shoulder and elbow movements are the same and that these controls operate in an additive and balanced manner.

Figure 2D:
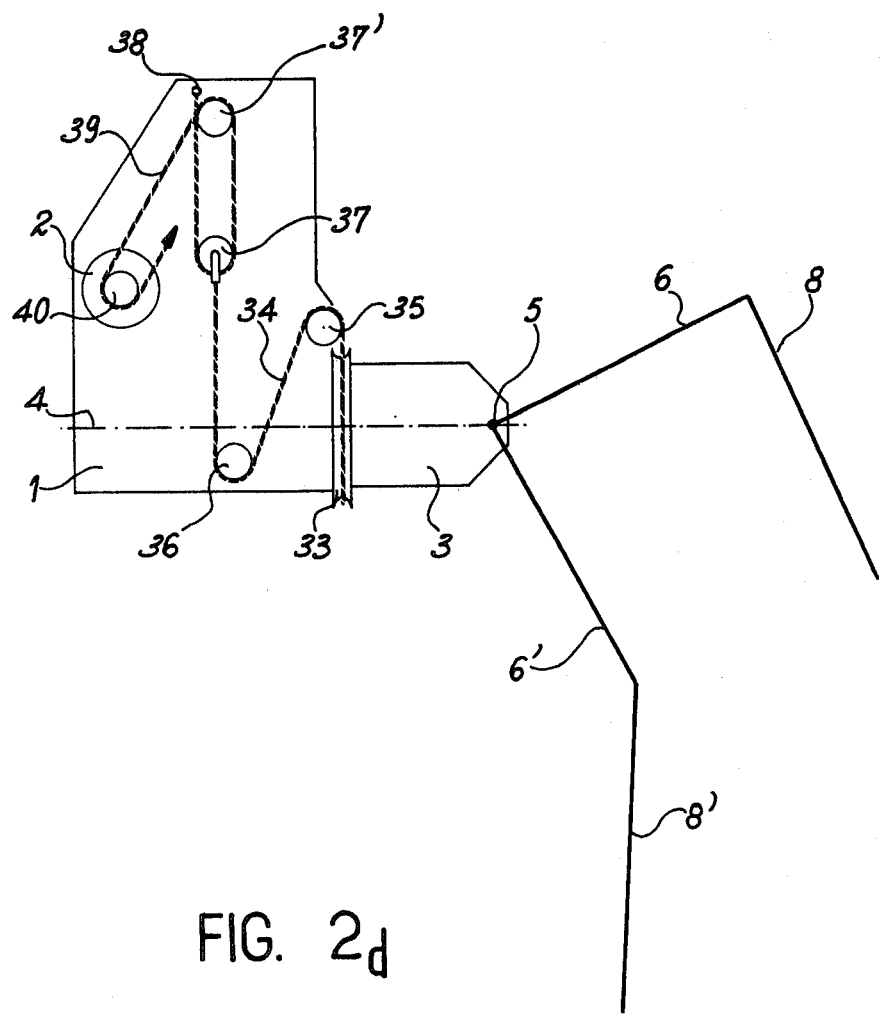

FIG. 2d illustrates the devices for cable-transmission of the movement of the barrel unit about the axis 4, namely the movement of general rotation. It is apparent from FIG. 2d that the barrel unit 3 rotates about the axis 4 and carries the arms 6, 8. At the point of junction of the barrel unit and of the body 1, said unit carries a large pulley 33 for driving the barrel unit which is displaced by means of oppositely-acting cable lengths as designated by the reference 34, the opposite length having been omitted from this figure. In the arrangement shown in FIG. 2d, a return pulley 35 guides the cable length 34 in return motion within the body 1, whilst a second return pulley 36 serves to place the pulley-block 37, 37' in the most suitable location. Said pulley-blocks carry at least two cable lengths and a fixed point 38 and are similar to the pulley-blocks shown in FIG. 2a. The emergent cable length 39 is returned onto a capstan 40 carried by a pair of opposed motors such as 2 whilst the opposite arm is guided on the same capstan 40 on a path which brings it to a similar pulley-block (not shown). It is readily apparent that, in the longitudinal arrangement of a manipulator of the type shown in FIG. 1b, the pulley-blocks such as 37 would be located in the general axis of the manipulator by modifying the return around the pulley 36.

It is finally apparent that the reductions achieved on the one hand by the diameter of the pulley 33 and the number of cable lengths of the pulley-block 37, 37' must produce the desired value of torque for the manipulator in the downwardly extended position as shown at 6', 8'.

Figure 3A:
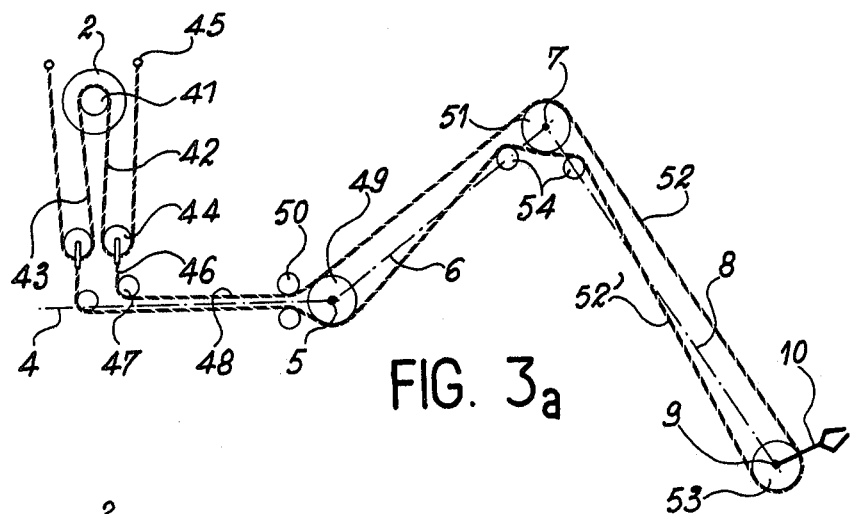
FIGS. 3a and 3b are diagrams showing the cables for controlling the movement of rotation of the lower arm and of the wrist articulation.
Figure 3B:
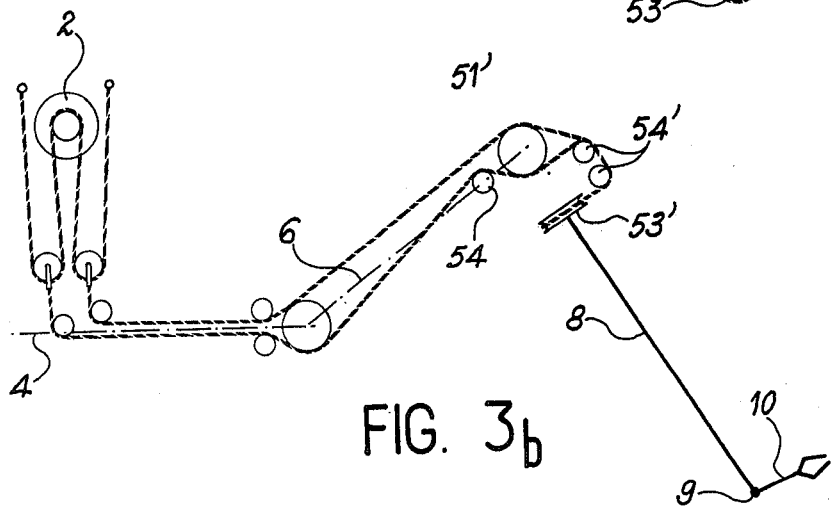
Figure 4:
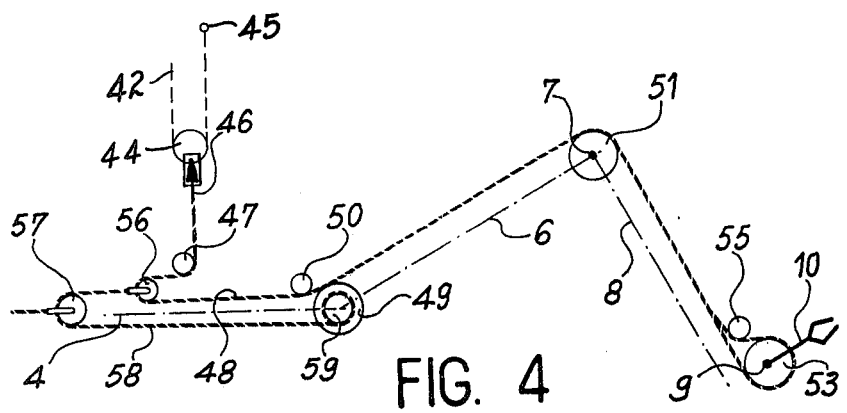

FIGS. 3 and 4 show the cable systems for transmitting the different movements corresponding to the lower arm or fore-arm, namely on the one hand the movement of rotation represented in FIG. 1 by the arrow 11 and on the other hand the two lifting and rotational movements of the tong unit which are also shown in the same FIG. 1a, thus constituting six oppositely-acting cables per pair. FIG. 3 shows a first embodiment of the invention relating to transmission in the case of these three pairs of cables. FIG. 3a shows the toggle-joint movement. By means of one of the motors such as 2 which carries a capstan 41, the two oppositely-acting cable lengths 42 and 43 pass into pulley-blocks which carry at least two lengths (only two lengths being shown in this figure) which are wound around the movable pulley-block 44, the cable length being passed back and attached to a fixed point 45, no reference being assigned to the second pulley-block. The cable 46 which is subjected to the multiplied effort is applied against a return pulley 47. At 48, said cable length is parallel and in the vicinity of the other lengths already mentioned, namely in the vicinity of the axis of general motion 4 and is applied against a first pulley 49 having an axis 5, bearing pulleys such as 50 being necessary as already noted in order to prevent detachment of the cable according to the amplitude of the shoulder movement. The cable length then passes over a pulley 51 having the same diameter as the pulley 49 and an axis 7. The cable then continues along the fore-arm or lower arm 8 at 52 and is finally attached to a pulley 53 having an axis 9 (toggle-joint axis). In the example shown, said pulley is secured to the pin of the tong unit 10 and has the same diameter as the pulleys 49 and 51. The opposite length passes on the other side of the pulley 53, returns over the pulley 51 at the level of the elbow 52' at which two bearing pulleys 54 are necessary, then returns beneath the pulley 49 along the layer in the vicinity of the axis 4 and so forth.

It is apparent from the foregoing that, when an elbow or shoulder movement takes place and if the motor corresponding to this movement remains stationary, the result achieved by the equality of diameters of the pulleys 49, 51 and 53 is that the lengths of the portions of cables which are wound around said pulleys maintain the same orientation of the pulley 53 in space irrespective of the combination of elbow and shoulder movements. This constitutes the equivalent of a double articulated parallelogram. In particular, irrespective of said movement, the oppositely-acting cable runs which follow this path do not undergo any variation in tension since the length which is wound onto each pulley on one side is counterbalanced by an equal length which is unwound on the other side; it can be readily understood that the bearing pulleys such as the pulleys 50 and 54 can be arranged in the most suitable locations as required by the precise values of angular displacements which are necessary and are shown in this case solely by way of example.

It will be noted that the cable system shown in FIG. 3a can in fact comprise two identical assemblies for controlling a toggle joint having two degrees of freedom in accordance with a known design and the closing of tongs or clamping action in which only a single length of cable and an oppositely-acting spring are employed in accordance with customary practice.

In the particular case of the elbow movement alone, it can be seen that the pulley 53 as shown in this figure in the same plane as the pulley 51 retains its orientation in space. As has already been seen in FIG. 1, the lower arm 8 is also endowed with a movement of rotation about its own axis as indicated by the arrow 11 in FIG. 1a. In the event that this movement of rotation has caused the pulley 53 to move away from the plane in which it is shown in FIG. 3a, it is clearly apparent that, by twisting the layer formed by the two cable lengths such as 52, the pulley 53 will rotate at the time of the elbow movement through the same angle with respect to the axis of the lower arm 8, that this latter will have rotated about the elbow axis 7 but this time will not remain parrallel to itself in space. Under these conditions, the initiation of an elbow movement alone will have the effect of imparting a complex movement to the grab 10 as shown in FIG. 3a or, if the elbow undergoes deflection, the grab will have a tendency to lift and move towards the fore-arm axis 8. It is readily apparent that a movement of this type is strictly compensated if the master arm which controls said manipulator is arranged in the same manner. Thus the operator displaces his elbow unit while retaining the wrist unit by hand in a constant direction in space and this will have the effect of imparting the same movement to the homothetic slave arm. It is also readily apparent that the same applies to all the movements of said lower arm, namely the movement of rotation in the direction of the arrow 11 shown in FIG. 1, the grab closure movement and so forth.

The cable arrangement for the movement of rotation of the fore-arm about its longitudinal axis 8 is shown in FIG. 3b. A pulley 53' having an axis 8 is the driving pulley which produces the movement. Return pulleys such as 54' permit changes of plane of the cable runs.

In the event that an arrangement as just described gives rise to difficulties, another alternative embodiment of the invention shown in FIG. 4 overcomes the disadvantage of the arrangement shown in FIG. 3. In this alternative arrangement, all the cable lengths pass on the same side of their shoulder pulley 49, thus entailing the need for pulleys which are placed in side-by-side relation and only one of which is shown in the drawing as well as for bearing pulleys 50; these cable lengths 48 follow the upper arm 6, will be applied against pulleys 51 on the same side and follow the lower arm 8, will be fixed this time on the pulley 53 having a toggle-joint axis 9, thus entailing the need for a further auxiliary bearing pulley 55 which is rigidly fixed to the lower arm. When a shoulder movement takes place alone, this arrangement in which the pulleys 49, 51 have the same diameter has the effect of winding the same length of cable around one of the pulleys as that which is unwound around the other pulley whilst the fore-arm or lower arm remains parallel to itself. On the other hand, at the time of an elbow movement, the cable lengths are wound or unwound at the same time on the pulleys such as 51. The arrangements in accordance with this alterative embodiment of the invention compensate for this variation in winding around the pulley 51 in accordance with the arrangement shown in FIG. 4. According to this figure cable 46 is attached to the pulley-block 44 after having passed over a return pulley 47. The cable 42 is anchored at 45 and connected to a capstan on a motor 2 as shown in FIG. 3a. Another return pulley 56 constitutes a two-cable pulley-block; this pulley-block 56 is subjected to a longitudinal displacement parallel to the axis 4 which is intended to compensate for the winding or unwinding which has just been mentioned. To this end, a return pulley 57 attached to a fixed point of the manipulator body receives the pulley-block 56 and returns the length of cable 58 to the shoulder in which said length 58 is wound around a small pulley 59 and fixed on this latter in accordance with the same arrangement as that shown in FIG. 2a. The other cable is entrained aout an identical set of pulleys which are located side by side with the just described pulley and cable arrangement and is not shown for this reason. However one skilled in the art would readily understand such an arrangement. Since the cable lengths pass over the top of the pulley 51, the cable length 58 will pass beneath said pulley 59, the diameter of which is one-half the diameter of the pulley 51. The doubling pulley-block 56 cooperates so as to provide strict compensation for the lengths which are wound or unwound around the pulleys such as 51 during an elbow movement, the pulley 59 being accordingly associated with the same movement as the elbow pulley. In other words, it can be understood with reference to FIG. 2 that the small pulley 59 is associated with the movements of the pulley 27 or of the pulley 29 shown in FIG. 2b or 2c.

In this arrangement, when an elbow movement is performed alone, all the cables which produce the movements of the lower arm, grab, toggle joint, a movement of rotation 11 and so forth do not have any relative movement with respect to said lower arm.

The accompanying drawings are intended to show only a schematic operational arrangement. In the practical construction of the manipulator, the path of the cables is the same in general principle but complicated by various guide pulleys, devices for regulating tension, arresting movements by gripping cables and so forth.

It is of special interest in practice to make use of this arrangement at least for the grab closure cable so that, when the object is held in the grab or tong unit, it is thus possible to produce a braking action on the corresponding motor by interrupting the current supply and thus to prevent heat build-up while permitting the tong unit to remain in the same clamping position irrespective of the movements of the manipulator. It is wholly evident that, if this arrangement is applied to all the movements of the lower arm, a single cable 58 and a single return pulley 57 serve to displace the corresponding number of pulleys 56 considered in a single pulley-block which is maintained parallel to itself by suitable guiding means, thus compensating for all the windings of these cables around equal pulleys which correspond thereto at the elbow axis 7.

The foregoing description serves to gain an understanding of the main advantages derived from the arrangement of a manipulator in accordance with the invention. These advantages lie firstly in the arrangement of all the motors on the manipulator body, thereby achieving in the first place a maximum reduction of moving masses, that is to say the barrel unit 3 and the arms 6 and 8. In the second place, the necessary motion reductions are ensured solely by making use of pulley-blocks of the cable or belt type which are designed to carry at least two runs of cable or belt. The simplicity of constructional design and the total absence of play of said pulley-blocks permit follow-up control of manipulator arms with a high degree of accuracy and at low cost.

Finally, the use of devices of the type described is more particularly suited to the construction of manipulator arms which are intended to be employed under extreme conditions such as operation in water or different liquids or operation in a vacuum and are thus of equal interest in industrial, submarine or space applications. The cable and pulley systems are in fact very readily adaptable to these extreme media whilst only the motors themselves need be placed within leak-tight enclosures in order to afford protection against deleterious media and to ensure reliable operation. It is known that leakproof shielding systems give rise to difficulties under such extreme conditions of operation under water or in outer space and have accordingly been reduced to a minimum.

What we claim is:

1. A power manipulator of the articulated type comprising a stationary body on which are mounted at least four motors and on which a barrel unit is mounted for rotation about an axis of general rotation, said axis of general rotation coinciding with the longitudinal axis of said barrel unit, drive means including one of said motors for rotating said barrel unit about said axis, arm means pivoted on said barrel unit and comprised of an upper arm element pivotally attached to said barrel unit by means of a shoulder pin having an axis which intersects with said axis of general rotation and of a lower arm element pivotally attached to the upper arm by means of an elbow pin, said lower arm element having a wrist pin at the free end thereof which supports an end element for at least one pivotal movement about said wrist pin, means for counterbalancing said arm means, separate drive means including a motor for controlling the pivoting of each of said elements about their respective pins, said separate drive means for pivoting said upper arm element about said shoulder pin and said lower arm element about said elbow pin each comprising said motor, a pulley secured to the arm element, cable means comprising two oppositely acting length secured to and extending over said pulley and connected to a pair of pulley block means located within said barrel unit, each pulley block means including a cable length which emerges from each pulley block means, extends over a return on one of said pins and is guided within said stationary body so as to remain parallel to the axis of said barrel unit and is operatively connected to said motor for actuation thereby.

2. A manipulator according to claim 1 wherein the separate drive means for controlling the movements of said end element include a pulley secured to said end element and two oppositely acting lengths of cable connected to said pulley which is secured to said end element, said oppositely acting lengths of cable pass on each side of two pulleys having the same diameter which are secured respectively to said shoulder pin and to said elbow pin and wherein each length of said cable is guided within the barrel unit by means of return pulleys secured respectively to the barrel unit and to the body so as to ensure that the lengths are parallel to the axis of said barrel unit, the end of each length of said cable being secured to a movable pulley of a pulley block means comprising an additional cable having at least two lengths, one of the extremities of said additional cable being stationary and the other extremity being wound onto and secured to a common capstan mounted on said motor of the drive means which is rigidly fixed to said body.

3. A manipulator according to claim 1 wherein the separate drive means for controlling the movements of said end element include a pulley secured to said end element and two oppositely acting lengths of able connected to said pulley secured to said end element which pass on the same side of the two pulleys having the same diameter which are secured respectively to the shoulder pin and the elbow pin and wherein said two oppositely acting lengths are guided within said barrel unit by a dual pulley block system including for each length a return pulley and a pulley which is capable of moving in a direction parallel to the axis of said barrel unit so as to ensure that each length is parallel to the axis of said unit, each oppositely acting length of cable at the exit of each movable pulley being directed about the respective return pulley and connected to a pulley block carrying at least two lengths of cable driven by said motor which is secured to said body, each movable pulley being driven by a separate cable passed over a pulley which is rigidly fixed to said body and placed in the axis of said barrel unit, said separate cable being secured at one end to the shaft of said movable pulley and at the other end to a small pulley rigidly fixed to the shoulder pin and having a diameter which is one half of the pulley which is rigidly fixed to said shoulder pin.

4. A manipulator according to claim 1 wherein said cables are controlled by capstans which are rigidly fixed to the shafts of said motors.

5. A manipulator according to claim 1 wherein said body on which said motors are fixed is located in the line of extension of the axis of said barrel unit.

6. A manipulator according to claim 1 wherein said body is placed above said barrel unit.

* * * * *